United States Patent
Kim

(10) Patent No.: US 9,914,351 B2
(45) Date of Patent: Mar. 13, 2018

(54) AIR FLAP DEVICE FOR VEHICLE

(71) Applicant: HYUNDAI MOBIS CO., LTD., Seoul (KR)

(72) Inventor: In Cheol Kim, Yongin (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 14/542,290

(22) Filed: Nov. 14, 2014

(65) Prior Publication Data

US 2016/0059688 A1 Mar. 3, 2016

(30) Foreign Application Priority Data

Sep. 1, 2014 (KR) .................. 10-2014-0115302

(51) Int. Cl.
*B60K 11/00* (2006.01)
*B60K 11/08* (2006.01)

(52) U.S. Cl.
CPC ............. *B60K 11/085* (2013.01); *Y02T 10/88* (2013.01)

(58) Field of Classification Search
CPC .... B62D 25/085; B62D 25/081; B60K 11/04; B60K 11/08; B60K 11/085
USPC ................................................ 180/68.1, 68.2
See application file for complete search history.

(56) References Cited

U.S. PATENT DOCUMENTS

| | | | | |
|---|---|---|---|---|
| 1,520,232 A * | 12/1924 | French | ................. | E05G 7/004 109/16 |
| 1,806,153 A * | 5/1931 | Edwards | ................. | F01P 7/12 123/41.05 |
| 2,551,921 A * | 5/1951 | Arsem | ................. | F01P 7/12 123/41.04 |
| 5,732,666 A * | 3/1998 | Lee | ................. | F01P 7/026 123/41.05 |
| 8,708,078 B2 * | 4/2014 | Charnesky | ................. | B60K 11/085 180/68.4 |
| 2006/0060401 A1 * | 3/2006 | Bole | ................. | B62D 35/001 180/68.1 |
| 2010/0139583 A1 * | 6/2010 | Klotz | ................. | B60K 11/085 123/41.04 |
| 2011/0247779 A1 * | 10/2011 | Charnesky | ................. | B60K 11/085 165/41 |
| 2012/0012410 A1 * | 1/2012 | Hori | ................. | B60K 11/085 180/68.1 |
| 2012/0132474 A1 * | 5/2012 | Charnesky | ................. | B60K 11/085 180/68.1 |

(Continued)

FOREIGN PATENT DOCUMENTS

CN 103358890 A 10/2013
KR 10-2014-0033802 A 3/2014

*Primary Examiner* — James A Shriver, II
*Assistant Examiner* — Vaughn Coolman

(57) ABSTRACT

Disclosed is an air flap device for a vehicle which includes left and right flap units which are formed of a combination of a plurality of opposite flaps rotatably installed at left and right sides, wherein the left and right flap units are obliquely installed facing each other in such a way that the opposite side ends thereof protrude forward; a link which interconnects the other side ends of the plurality of flaps of the outer sides of the left and right flap units; and a driving force transfer unit which is installed between the left and right flap units and interconnects a predetermined pair of opposite left and right flaps of the left and right flap units.

11 Claims, 4 Drawing Sheets

(56) References Cited

U.S. PATENT DOCUMENTS

| | | | |
|---|---|---|---|
| 2013/0012115 A1* | 1/2013 | Schwarz | B60K 11/085 454/155 |
| 2013/0264047 A1* | 10/2013 | Charnesky | B60K 11/085 165/287 |
| 2013/0264133 A1* | 10/2013 | Remy | B60K 11/085 180/68.1 |
| 2014/0094104 A1* | 4/2014 | Manhire | B60K 11/085 454/152 |
| 2014/0129078 A1* | 5/2014 | Jeong | G06F 11/30 701/32.8 |
| 2014/0273807 A1* | 9/2014 | Frayer, III | B60K 11/085 454/335 |
| 2014/0284123 A1* | 9/2014 | Bourqui | B60K 11/085 180/68.1 |
| 2014/0295749 A1* | 10/2014 | Hijikata | B60K 11/085 454/256 |
| 2014/0308890 A1* | 10/2014 | Schneider | F24F 13/1426 454/335 |
| 2014/0335778 A1* | 11/2014 | Takanaga | B60K 11/085 454/333 |
| 2014/0346809 A1* | 11/2014 | Lee | B60K 11/085 296/180.5 |
| 2015/0020758 A1* | 1/2015 | Hosono | F01P 7/02 123/41.04 |
| 2015/0050875 A1* | 2/2015 | Knauer | B60K 11/085 454/152 |
| 2015/0072604 A1* | 3/2015 | Yoo | B60K 11/085 454/152 |
| 2015/0090508 A1* | 4/2015 | Chappex | F01P 7/10 180/68.1 |
| 2015/0136500 A1* | 5/2015 | Boom | B60K 11/085 180/68.1 |
| 2015/0159541 A1* | 6/2015 | Solazzo | B60K 11/085 73/114.68 |
| 2015/0197147 A1* | 7/2015 | Koh | H02K 3/28 180/68.1 |
| 2015/0231962 A1* | 8/2015 | Ruppert | B60K 11/085 180/68.1 |
| 2015/0321548 A1* | 11/2015 | Hori | B60K 11/085 180/68.1 |

\* cited by examiner

AIR FLAP DEVICE FOR VEHICLE

CROSS-REFERENCE TO RELATED APPLICATIONS

This application claims priority to and the benefit of Korean Patent Application No. 10-2014-0115302 filed in the Korean Intellectual Property Office on Sep. 1, 2014, the entire contents of which are incorporated herein by reference.

TECHNICAL FIELD

The he present invention relates to an air flap device for a vehicle capable of minimizing the amount of stranded air by obliquely installing left and right flap units which are opposite to each other at left and right sides.

BACKGROUND ART

In general, the engine room configured to accommodate an engine, a transmission, and the like, is installed at a front side of a vehicle. A variety of components such as an engine installed in an engine room radiate heat in the course of operations. An air passage is formed at a front side of the engine room so as to properly cool the heat with the aid of the input of external air. However, it needs to block the engine room from the outside by closing the air passage so as to prevent excessive cooling of the engine room during the freezing season like the winter, and it also needs to open the air passage during the summer so as to prevent the temperature of the engine room from excessively going up. For this reason, an air flap device configured to open or close the air passage is provided in the vehicle.

The air flap device for a vehicle is installed at the backside of a grill so as to improve the aerodynamic performance and fuel efficiency of the vehicle. The air flap device for a vehicle is a device for controlling the opening and closing of air which is inputted inside of the vehicle in such a way to drive the flap. The air flap device for a vehicle determines whether or not the flap is opened based on the received cooling condition of the vehicle and enables the flap to rotate by driving an actuator to drive a loader and a link connected to the actuator to thereby open or close the air passage. The air flap device for a vehicle includes a plurality of flaps which are rotatably installed to open or close the air passage of a housing, a link which interconnects the plurality of the flaps for rotating the flaps together, and an actuator which provides rotational driving force to the link.

However the conventional air flap device for a vehicle is constituted such that a flap surface and a rotary shaft configured to rotate the flap are formed on a plane, respectively, so that the distance between a buffer surface with a curved surface and the flap surface gradually widens toward the direction of the center. As a result, such a structure causes a problem wherein the amount of the stranded air increases under the situation wherein the air passing through the bumper grill is no longer inputted into the engine room because the flaps are closed, to thereby greatly decrease the effects of improving aerodynamic performance and fuel efficiency.

Meanwhile, as one example of the air flap device for a vehicle, the Korean Patent Publication No. 10-2014-0033802 describes "an air flap device for a vehicle for opening or closing a front side opening formed at the vehicle and a failure determining method for determining the failure thereof".

SUMMARY OF THE INVENTION

The present invention has been made in an effort to provide an air flap device for a vehicle capable of minimizing the amount of stranded air by obliquely installing left and right flap units which are opposite to each other at left and right sides.

An exemplary embodiment of the present invention provides an air flap device for a vehicle including left and right flap units which are formed of a combination of a plurality of opposite flaps rotatably installed at left and right sides, wherein the left and right flap units are obliquely installed facing each other in such a way that the opposite side ends thereof protrude forward; a link which interconnects the other side ends of the plurality of the flaps of the outer sides of the left and right flap units; and a driving force transfer unit which is installed between the left and right flap units and interconnects a predetermined pair of opposite left and right flaps of the left and right flap units.

Also, one flap among the plurality of the flaps may pass through the link and be connected to an actuator.

In addition, each flap forming the left and right flap units may include a rotary shaft, so that the flaps may rotate by the rotation of the rotary shaft.

In addition, The left and right flap units may be installed corresponding to left and right air passages partitioned at the left and right sides inside of the housing so as to open or close the left and right air passages, and the left and right sides of the housing are obliquely formed in a shape wherein the center of the housing protrudes forward to correspond to the left and right flap units, and the interior of the housing may be partitioned by a vertical frame into a central partition unit and left and right air passages formed at both sides about the central partition unit.

Also, the left and right side ends of each rotary shaft may be rotatably supported by the vertical frame installed inside of the housing.

In addition, the driving force transfer unit may be installed at the central partition unit of the housing, and the driving force transfer unit may interconnect a predetermined pair of opposite left and right rotary shafts of the left and right flap units.

In addition, each rotary shaft and the link may be connected to a loader, respectively.

The driving force transfer unit may be constituted in a gear structure.

The driving force transfer unit of the gear structure may include opposite first and second gears which are installed at one side end of each of the pair of left and right rotary shafts; and a third gear which is engaged with each of the first and second gears.

Also, the driving force transfer unit may be a universal joint.

The foregoing summary is illustrative only and is not intended to be in any way limiting. In addition to the illustrative aspects, embodiments, and features described above, further aspects, embodiments, and features will become apparent by reference to the drawings and the following detailed description.

ADVANTAGEOUS EFFECTS

The air flap device for a vehicle according to an exemplary embodiment of the present invention is capable of minimizing the amount of stranded air by obliquely installing left and right flap units which face each other at left and right sides.

Also, it is possible to expect the effects of improving fuel efficiency thanks to the minimized amount of the stranded air.

Also, it is possible to make a design wherein the flap surface may be exposed to the outside.

Figure 1:
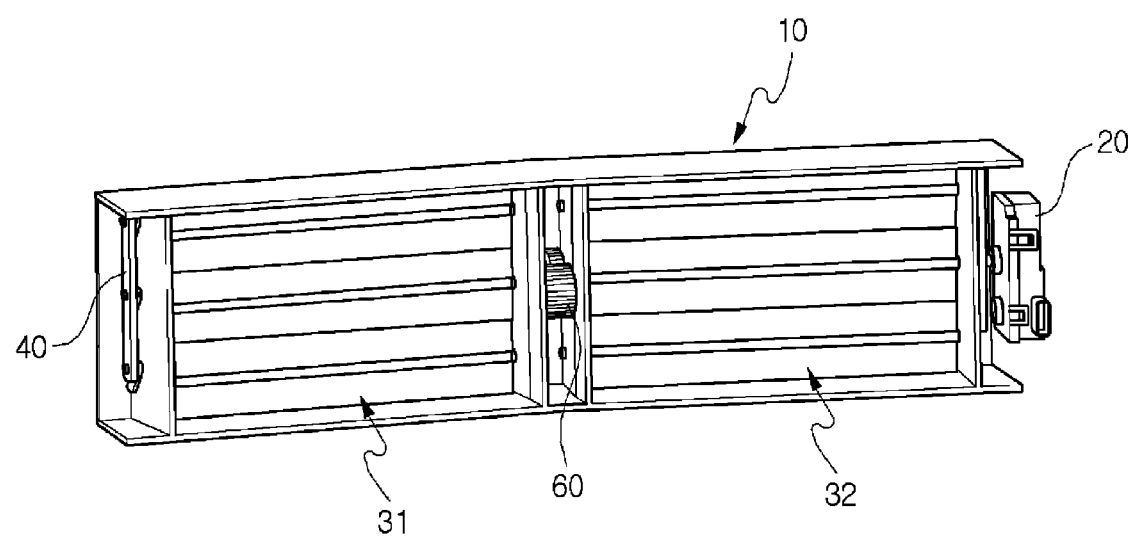
FIG. 1 is a view illustrating the whole configuration of an air flap device for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings.

Hereinafter, exemplary embodiments of the present invention will be described in details with reference to the accompanying drawings. It is noted that when adding the reference numerals to the components illustrated in each drawing, the same components are given the same reference numerals even though they are indicated on different drawings. In addition, the exemplary embodiment of the present invention will be described below, but it is obvious that the technical concepts of the present invention are not limited or restricted thereto, and a person having ordinary skill may modify and implement them in various forms.

First, the configuration of the air flap device for a vehicle according to an exemplary embodiment of the present invention will be described.

FIG. 1 is a view illustrating the whole configuration of an air flap device for a vehicle according to an exemplary embodiment of the present invention. Referring to FIG. 1, the air flap device for a vehicle according to the exemplary embodiment of the present invention includes a housing 10, a left flap unit 31 installed at a left air passage 11 of the housing 10, a right flap unit 32 installed at a right air passage 12 of the housing 10, a link 40 installed at the other side end of the outer side of the left flap unit 31, a link 40 installed at the other side end of the outer side of the right flap unit 32, and an actuator 20 which is installed at the link 40 of either the left flap unit 31 or the right flap unit 32.

Figure 2:
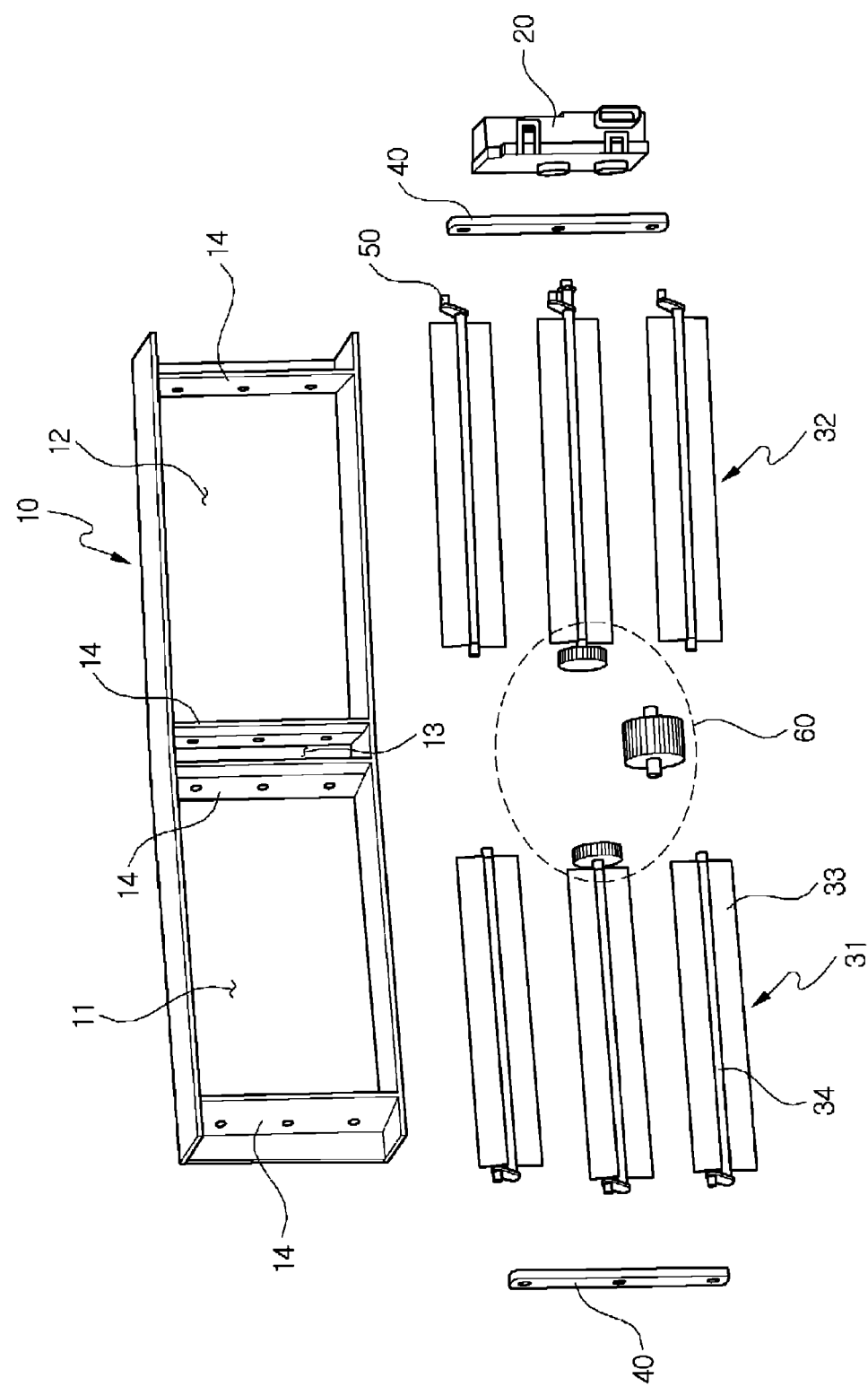
FIG. 2 is a separated perspective view illustrating an air flap device for a vehicle according to an exemplary embodiment of the present invention.
Figure 3:
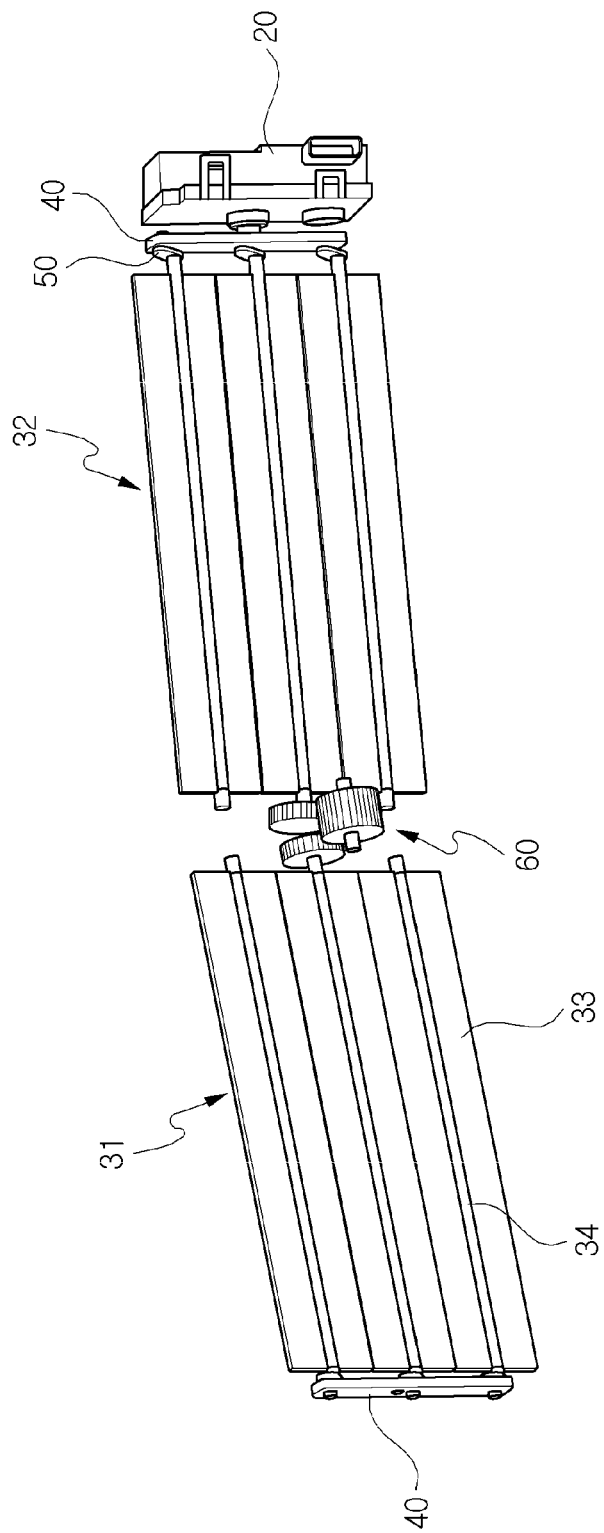
FIG. 3 is a view illustrating a configuration of an air flap device for a vehicle from which a housing is removed according to an exemplary embodiment of the present invention.

FIG. 2 is a separated perspective view illustrating an air flap device for a vehicle according to an exemplary embodiment of the present invention and FIG. 3 is a view illustrating a configuration of an air flap device for a vehicle from which a housing is removed according to an exemplary embodiment of the present invention.

Referring to FIGS. 2 and 3, the housing 10 is installed at the backside of the vehicle grill. The housing 10 is configured to let external air flow toward the engine room and serves to support the left flap unit 31 and the right flap unit 32.

The housing 10 is formed roughly in a rectangular shape by means of frames and includes a left air passage 11 wherein the left flap unit 31 is installed and a right air passage 12 wherein the right flap unit 32 is installed at left and right sides inside of the housing 10. Air is inputted into the inside of the vehicle through the left air passage 11 and the right air passage 12.

A central partition unit 13 including a driving force transfer unit 60 is provided between the left air passage 11 and the right air passage 12 inside of the housing 10. The central partition unit 13 inside of the housing 10 and the left air passage 11 and the right air passage 12 provided at left and right sides of the central partition unit 13 may be partitioned by means of a plurality of vertical frames 14 vertically installed inside of the housing 10. Meanwhile, the left and right sides of the housing 10 each have a structure whose center protrudes forward in a slanted shape like " 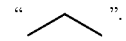 ".

The left flap unit 31 and the right flap unit 32 are rotatably installed at the left air passage 11 and the right air passage 12 of the housing 10, respectively, and are facing each other. The left flap unit 31 and the right flap unit 32 are formed of a combination of a plurality of flaps 3. Each of the flaps 33 serves to open and close the left air passage 11 and the right air passage 12 of the housing 10 based on the rotational operations thereof.

The left flap unit 31 and the right flap unit 32 are installed facing each other at left and right sides in order for the opposite centers thereof to protrude forward in a slanted shape like " 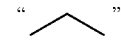 "

as in the housing 10. The plurality of the flaps 33 forming the left flap unit 31 and the right flap unit 32 are arranged in a row in vertical directions. FIGS. 2 and 3 illustrate that three flaps 33 are arranged at each of the left flap unit 31 and the right flap unit 32, but the present invention is not limited thereto. For example, more than three flaps 33 may be arranged.

A rotary shaft 34 is installed at the center of the flaps 33 forming the left flap unit 31 and the right flap unit 32. The left and right ends of each rotary shaft 34 are rotatably supported by a vertical frame 14 of the housing 10, respectively. The flaps 33 can rotate by rotation of the rotary shaft 34.

The link 40 serves to simultaneously rotate the flaps 33 forming the left flap unit 31 and the right flap unit 32. The link 40 is connected to the other side end of the outer side of each of the left flap unit 31 and the right flap unit 32.

More specifically, the left side end of each rotary shaft 4 of the left flap unit 31 is connected to each link 40. At this time, the rotary shaft 34 and the link 40 are connected by a loader 50. Of course, the loader is installed by a predetermined number corresponding to the rotary shafts 34.

Similarly, the right side end of each rotary shaft 34 of the right flap unit 32 is connected to each link 40. At this time, the rotary shaft 34 and the link 40 are connected by the loader 50. Of course, the loader is installed by a predetermined number corresponding to the rotary shafts 34.

Referring to FIG. 3, an actuator 20 is installed at the link 40 of the right flap unit 32 so as to rotate the flaps 33 forming the right flap unit 32. Alternatively, the actuator 20 may be installed at the link 40 of the left flap unit 31 or may be installed at the link 40 of the left flap unit 31 as well as the link of the right flap unit 32. The output shaft of the actuator 20 is connected to any one of the rotary shafts 34 which have passed through the link 40. For example, in a case where there are three rotary shafts 34 installed, it is preferred that the rotary shaft 34 in the middle of the three rotary shafts 34 is connected to the actuator 20.

The driving force transfer unit 60 is installed at the central partition unit 13 of the housing 10. The driving force transfer unit 60 servers to transfer the rotational force transferred from the actuator 20 from the right flap unit 32 to the left flap unit 31.

Figure 4:
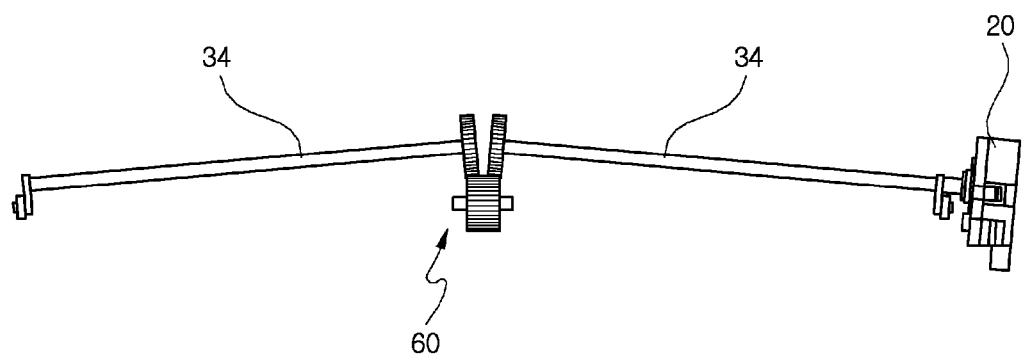
FIG. 4 is a plane view illustrating left and right flap units according to an exemplary embodiment of the present invention.
Figure 5:
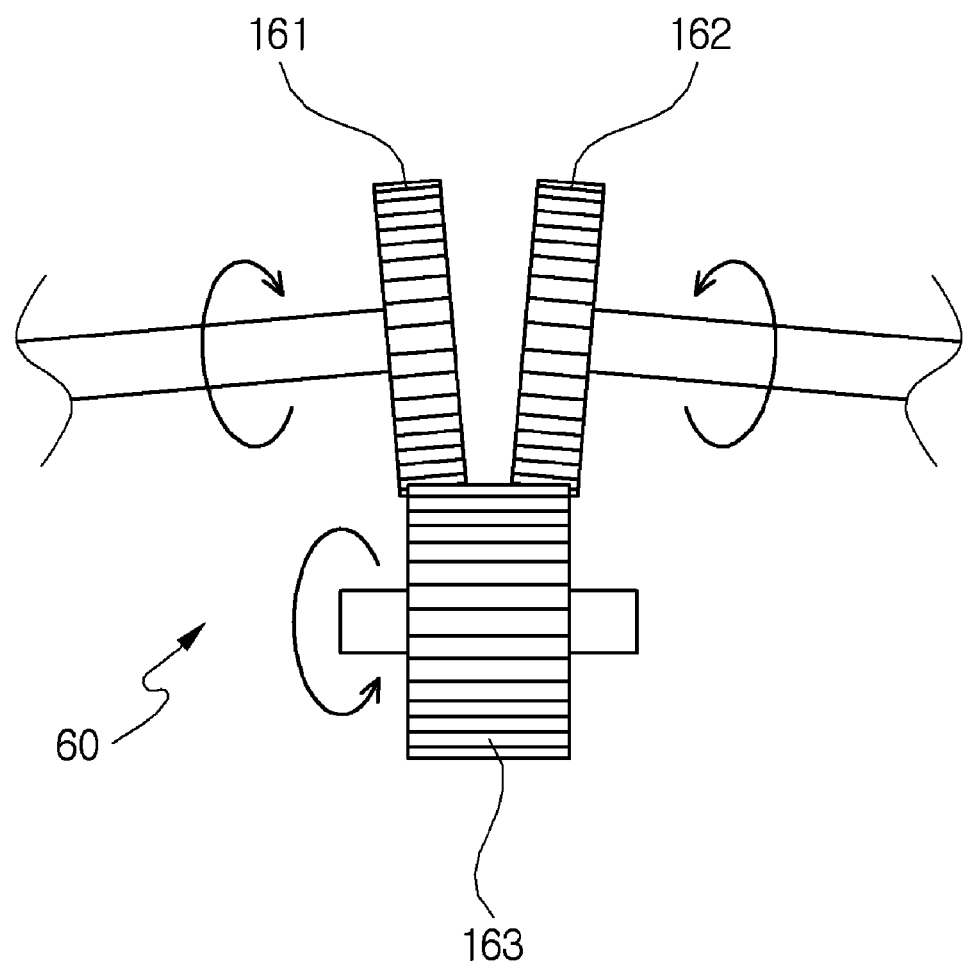
FIG. 5 is an enlarged view illustrating a driving force transfer unit according to an exemplary embodiment of the present invention.

FIG. 4 is a plane view illustrating flap units according to an exemplary embodiment of the present invention and FIG. 5 is an enlarged view illustrating a driving force transfer unit according to an exemplary embodiment of the present invention. Referring to FIGS. 4 and 5, the driving force transfer unit 60 is installed between the left flap unit 31 and the right flap unit 32 in order for the left flap unit 31 and the right flap unit 32 to cooperate together.

More specifically, the driving force transfer unit 60 is connected to one side end of each of a pair of facing rotary shafts 34 of the left flap unit 31 and the right flap unit 32. Referring to FIGS. 4 and 5, in a case where the left flap unit 31 and the right flap unit 32 each are formed of three rotary shafts 34, it is preferred that the driving force transfer unit 60 connects the rotary shaft 34 arranged in the middle of the left flap unit 31 among the three rotary shafts 34 and the rotary shaft 34 arranged in the middle of the right flap unit 32.

Referring to FIG. 5, the driving force transfer unit 60 includes a first gear 151 and a second gear 162 both installed at one side end of each of the opposite rotary shafts 34 of the left and right sides, and a third gear 163 which is engaged with each of the first gear 161 and the second gear 162 so as to transfer the rotation of the second gear 162 to the first gear 161. The first gear 161 and the second gear 162 are installed facing each other with a predetermined distance. Since the third gear 163 interconnects the first gear 161 and the second gear 162, the third gear 163 has a predetermined width greater than the width of each of the first gear 161 and the second gear 162.

Referring to FIG. 5, the gears belonging to the driving force transfer unit 60 are identified to be spur gears, but are not limited thereto. Any type of the gears may be used as far as the gears can interconnect the opposite rotary shafts 34 of the left and right sides. Meanwhile, in addition to the gear structure as illustrated in FIGS. 4 and 5, the driving force transfer unit 60 may be formed in a structure of a universal joint which may interconnect the rotary shafts 34 of the left and right sides.

Next, the opening and closing operations of the air flap device for a vehicle according to the exemplary embodiment of the present invention will be described.

Referring to FIGS. 3 to 5, when the actuator 20 operates, the rotational force of the actuator 30 is transferred to the rotary shaft 34 disposed at the center of the right flap unit 32 connected to the link 40.

The rotation of the rotary shaft 34 disposed at the center of the right flap unit 32 allows a corresponding flap 33 to rotate. The rotation of the rotary shaft 34 disposed at the center of the right flap unit 32 is transferred to the link 40 installed at the right flap unit 32 so as to rotate the link 40 by a predetermined angle. The other flaps 33 connected to the link 40 rotate together based on the rotation of the link 40, thus opening or closing the right air passage 12 of the housing 10.

Here, since the rotary shaft 34 disposed at the center of the right flap unit 32 connected to the actuator 20 is connected to the rotary shaft 34 disposed at the center of the left flap unit 31 by means of the driving force transfer unit 60, the rotational force of the actuator 20 is simultaneously transferred through the rotary shaft 34 disposed at the center of the right flap unit 32 to the rotary shaft disposed at the center of the left flap unit 31.

The rotation of the rotary shaft 34 disposed at the center of the left flap unit 31 allows a corresponding flap 33 to rotate. The rotation of the rotary shaft 34 disposed at the center of the left flap unit 31 is transferred to the link 40 installed at the left flap unit 31 and allows the link 40 to rotate by a predetermined angle. The rotation of the link 40 allows the other flaps 33 connected to the link 40 to rotate together, thus opening or closing the left air passage 11 of the housing 10.

In this manner, the left flap unit 31 and the right flap unit 32 are connected by the driving force transfer unit 60, so that the flaps 33 forming the left flap unit 31 and the right flap unit 32 rotate simultaneously, thus opening or closing the left air passage 11 and the right air passage 12 of the housing 10.

Meanwhile, the operation of the driving force transfer unit 50 having a gear structure will be described in detail. Referring to FIG. 5, the rotation of the rotary shaft 34 disposed at the center of the right flap unit 32 connected to the actuator 20 allows the second gear 162 to rotate. The second gear 162 is engaged with the third gear 163, and the third gear 163 is engaged with the first gear 161, so that the rotations of the second gear 162 are transferred through the third gear 163 to the first gear 161. As described above, the air flap device for a vehicle according to the exemplary embodiment of the present invention makes it possible to greatly improve the aerodynamic performance and fuel efficiency by minimizing the amount of stranded air since the opposite left flap unit and right flap unit are obliquely disposed to match with the arc-shaped bumper.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An air flap device for a vehicle, the device comprising:
a housing;
left and right flap units that each include a plurality of flaps and a plurality of rotary shafts that are rotatably installed in the housing, wherein the left flap unit is disposed at an oblique angle with respect to the right flap unit;
a left link that interconnects the plurality of rotary shafts of the left flap unit, and a right link that interconnects the plurality of rotary shafts of the right flap unit; and
a driving force transfer unit installed between the left and right flap units, the driving force transfer unit passively transferring a rotational force between a middle one of the rotary shafts of the left flap unit and a middle one of the rotary shafts of the right flap unit,
wherein the driving force transfer unit includes:
a first gear coupled to the middle one of the rotary shafts of the left flap unit, the first gear being a cylindrical gear;
a second gear coupled to the middle one of the rotary shafts of the right flap unit, the second gear being a cylindrical gear; and
a third gear having one or more teeth simultaneously engaged with the first gear and the second gear,
wherein the third gear rotates around a shaft that is mounted in the housing, the shaft being spaced apart from the middle one of the rotary shafts of the left flap unit and the middle one of the rotary shafts of the right flap unit.

2. The device of claim 1,
wherein the left and right flap units are installed corresponding to left and right air passages partitioned at left and right sides inside of the housing, and
wherein the driving force transfer unit is installed at a central partition unit of the housing.

3. The device of claim 2, wherein the driving force transfer unit is constituted in a gear structure.

4. The device of claim 1, wherein the left and right flap units are installed corresponding to left and right air passages partitioned at left and right sides inside of the housing so as to open or close the left and right air passages.

5. The device of claim 1,
wherein the left and right flap units are installed corresponding to left and right air passages partitioned at left and right sides inside of the housing, and
wherein left and right side ends of each rotary shaft are rotatably supported by a vertical frame installed inside of the housing.

6. The device of claim 1, wherein the left and right flap units are installed corresponding to left and right air passages partitioned at left and right sides inside of the housing, and the left and right sides of the housing are obliquely formed in a shape that corresponds to the left and right flap units.

7. The device of claim 1, wherein each rotary shaft is coupled to one of the left and right links by a loader.

8. The device of claim 1, wherein the left and right flap units are installed corresponding to left and right air passages partitioned at left and right sides inside of the housing, and the interior of the housing is partitioned by a vertical frame into a central partition unit and the left and right air passages formed at the left and right sides.

9. The device of claim 1, wherein the third gear has a greater width than either one of the first gear and the second gear.

10. A device, comprising:
a plurality of first rotary shafts arranged in parallel, each of the first rotary shafts being attached to a first flap;
a plurality of second rotary shafts arranged in parallel and at an oblique angle to the plurality of first rotary shafts, each of the second rotary shafts being attached to a second flap;
a first link interconnecting the plurality of first rotary shafts;
a second link interconnecting the plurality of second rotary shafts; and
a driving force transfer unit passively transferring a rotational force from a middle one of the first rotary shafts to a middle one of the second rotary shafts,
wherein the driving force transfer unit includes:
a first gear coupled to the middle one of the first rotary shafts, the first gear being a cylindrical gear;
a second gear coupled to the middle one of the second rotary shafts, the second gear being a cylindrical gear; and
a third gear having one or more teeth simultaneously engaged with the first gear and the second gear,
wherein the third gear rotates around a shaft that is mounted in a housing, the shaft being spaced apart from the middle one of the first rotary shafts and the middle one of the second rotary shafts.

11. The device of claim 10, wherein the third gear has a greater width than either one of the first gear and the second gear.

* * * * *